United States Patent
Wu et al.

(10) Patent No.: US 12,231,256 B2
(45) Date of Patent: Feb. 18, 2025

(54) METHOD AND SYSTEM FOR RECOGNIZING 2D MOVEMENT TRACK BASED ON SMART WATCH

(71) Applicant: SHENZHEN UNIVERSITY, Shenzhen (CN)

(72) Inventors: Kaishun Wu, Shenzhen (CN); Lin Chen, Shenzhen (CN); Cong Li, Shenzhen (CN); Yandao Huang, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 422 days.

(21) Appl. No.: 17/792,698

(22) PCT Filed: Sep. 7, 2020

(86) PCT No.: PCT/CN2020/113805
§ 371 (c)(1),
(2) Date: Jul. 13, 2022

(87) PCT Pub. No.: WO2021/143156
PCT Pub. Date: Jul. 22, 2021

(65) Prior Publication Data
US 2023/0076452 A1    Mar. 9, 2023

(30) Foreign Application Priority Data
Jan. 13, 2020 (CN) .......................... 202010031129.4

(51) Int. Cl.
*H04W 12/33* (2021.01)
*H04L 12/28* (2006.01)
(Continued)

(52) U.S. Cl.
CPC ............ *H04L 12/282* (2013.01); *H04L 67/12* (2013.01); *H04M 1/72448* (2021.01); *H04L 2012/2841* (2013.01); *H04M 2250/12* (2013.01)

(58) Field of Classification Search
CPC ......... H04W 4/02; H04W 4/029; H04W 4/38; H04W 84/18; H04W 12/50; H04W 76/11;
(Continued)

(56) References Cited

U.S. PATENT DOCUMENTS

2019/0299966 A1    10/2019    Dumble

FOREIGN PATENT DOCUMENTS

| CN | 102759994 A | 10/2012 |
|---|---|---|
| CN | 103712622 A | 4/2014 |

(Continued)

*Primary Examiner* — Tu X Nguyen
(74) *Attorney, Agent, or Firm* — Nitin Kaushik

(57) ABSTRACT

A method and a system for recognizing a two-dimensional (2D) movement track based on a smart watch is provided. The method comprises: acquiring accelerometer signal data and gyroscope signal data of the smart watch; estimating a tilt angle of the smart watch by using the accelerometer signal data and correcting the gyroscope signal data by using the tilt angle; and calculating angle value information of the smart watch by using the corrected gyroscope signal data and estimating a coordinate point. According to the present application, the movement track of the smart watch can be accurately estimated by using the accelerometer and the gyroscope built in the smart watch.

17 Claims, 3 Drawing Sheets

(51) Int. Cl.
*H04L 67/12* (2022.01)
*H04M 1/72448* (2021.01)

(58) Field of Classification Search
CPC ..... H04W 88/00; H04W 12/33; H04W 48/04; H04W 12/63; H04M 1/72415; H04M 1/72412; H04M 11/00; H04M 1/72448
See application file for complete search history.

(56) References Cited

FOREIGN PATENT DOCUMENTS

| | | | |
|---|---|---|---|
| CN | 105300381 A | | 2/2016 |
| CN | 109000612 A | | 12/2018 |
| CN | 110049537 A | * | 7/2019 |
| CN | 111221420 A | | 6/2020 |
| KR | 20150138831 A | * | 12/2015 |

* cited by examiner

METHOD AND SYSTEM FOR RECOGNIZING 2D MOVEMENT TRACK BASED ON SMART WATCH

CROSS REFERENCES TO THE RELATED APPLICATIONS

This application is a national phase of International Patent Application No. PCT/CN2020/113805 filed on Sep. 7, 2020, which claims priority based on Chinese patent application No. 202010031129.4 filed on Jan. 13, 2020. The disclosure of the aforementioned application is hereby incorporated by reference in its entirety.

TECHNICAL FIELD

The present application relates to the technical field of smart device interaction, and in particular to a method and a system for recognizing a 2D movement track based on a smart watch.

BACKGROUND

At present, with the increasing popularity of virtual reality (VR) and artificial intelligence technologies, smart watches and bracelets have become the mainstream in wearable field gradually. However, for users who use smart watches and bracelets, the screen size of the smart watch makes the operation extremely inconvenient. Meanwhile, with the coming of the 5G era, the market prospect in the field of smart homes is broader. At present, the main means of controlling smart homes is to control them through mobile phones, but the users do not always carry the mobile phones with them at home, and poor interaction experience between the users and the smart homes, complex operation and the like also become hot problems.

Therefore, improvements to the prior art are needed to further expand the functions of smart watches.

SUMMARY

The present application is intended to overcome the defects in the prior art and provide a method and a system for recognizing a 2D movement track based on a smart watch, which can achieve gesture tracking of a smart watch wearer.

According to a first aspect of the present application, a method for recognizing a 2D movement track based on a smart watch is provided. The method comprises:
acquiring accelerometer signal data and gyroscope signal data of the smart watch;
estimating a tilt angle of the smart watch by using the acceleration signal data and correcting the gyroscope signal data by using the tilt angle; and
calculating angle value information of the smart watch by using the corrected gyroscope signal data and estimating a coordinate point.

In one embodiment, estimating a tilt angle of the smart watch by using the acceleration signal data and correcting the gyroscope signal data by using the tilt angle, comprises steps of:
recording X, Y and Z axis data of the accelerometer signal data as $a_x$, $a_y$, $a_z$, respectively, and recording X, Y and Z axis data of the gyroscope signal data as $g_x$, $g_y$, $g_z$, respectively;
calculating an energy value $e = a_x^2 + a_y^2 + a_z^2$ of the accelerometer signal data, initializing an energy count $c=0$, and setting an energy threshold $e_{threshold}$ and an energy count threshold $c_{threshold}$;
judging whether the energy value e of the accelerometer signal data is less than or equal to the energy threshold, and if yes, updating energy count information $c=c+1$; judging whether the energy count c is greater than or equal to the energy count threshold $c_{threshold}$, and if yes, updating tilt angle information represented by $$\sin\theta = -\frac{a_y}{\sqrt{a_y^2 + a_z^2}}, \cos\theta = \frac{a_z}{\sqrt{a_y^2 + a_z^2}};$$

and
correcting gyroscope y-axis and z-axis angular velocity signal data by using the updated tilt angle information, represented by $\widehat{g_y} = g_y \times \cos\theta + g_z \times \sin\theta$, $\widehat{g_z} = g_y \times (-\sin\theta) + g_z \times \cos\theta$, wherein $\widehat{g_y}$ is the corrected gyroscope y-axis data, and $\widehat{g_z}$ is the corrected gyroscope z-axis data.

In one embodiment, the energy count threshold is set to $c_{threshold} = f \times 0.1$, and the energy threshold is set to $e_{threshold} = 0.04$, wherein f is a data sampling frequency.

In one embodiment, calculating angle value information of the smart watch by using the corrected gyroscope signal data and estimating a coordinate point, comprises steps of:
setting a time interval $$dt = \frac{1}{f}$$

for two samplings of the gyroscope signal data;
integrating the corrected gyroscope angular velocity signal data over time, represented by $\theta_x = \int g_x dt$, $\theta_y = \int \widehat{g_y} dt$, $\theta_z = \int \widehat{g_z} dt$, wherein $\theta_x$ is a roll angle, $\theta_y$ is a pitch angle, and $\theta_z$ is a yaw angle; and
setting base vectors in a two-dimensional Cartesian coordinate system as unit vectors $\overline{e_x} = (1,0)$, $\overline{e_y} = (0,1)$, wherein a current coordinate point is $(x, y) = \theta_z \overline{e_x} + \theta_y \overline{e_y} = (\theta_z, \theta_y)$.

In one embodiment, the method disclosed herein further comprises: broadcasting the coordinate point to a maintained list of clients after the estimated coordinate point is obtained.

In one embodiment, the acquired accelerometer signal data and gyroscope signal data of the smart watch are processed using Butterworth filtering.

According to a second aspect of the present application, a system for recognizing a 2D movement track based on a smart watch is provided. The system comprises: a module configured for acquiring accelerometer signal data and gyroscope signal data of the smart watch; a module configured for estimating a tilt angle of the smart watch by using the acceleration signal data and correcting the gyroscope signal data by using the tilt angle; and a module configured for calculating angle value information of the smart watch by using the corrected gyroscope signal data and estimating a coordinate point.

Compared with the prior art, the present application has the advantages that: the functions of the smart watch can be expanded without changing the software and hardware of the smart watch, and continuous gesture tracking and recording can be achieved. Simultaneously, through the cooperation with smart homes, computers, unmanned aerial vehicles and the like, smooth manipulation to the target devices with continuous movement by gesture tracking is achieved, which expands the application scenarios of smart watches.

BRIEF DESCRIPTION OF THE DRAWINGS

The following drawings are only for schematic illustration and explanation of the present application, and are not intended to limit the scope of the present application, wherein.

DETAILED DESCRIPTION OF THE EMBODIMENTS

In order to make the objectives, technical schemes, design methods and advantages of the present application more clear, the present application will be further illustrated in detail below by specific embodiments with reference to the accompanying drawings. It should be understood that the specific embodiments described herein are only used to illustrate the present application, but not to limit the present application.

In all examples shown and discussed herein, any specific value should be construed as exemplary only rather than limiting. Thus, other examples of the exemplary embodiments may have different values.

Techniques, methods, and devices known to those of ordinary skills in the relevant art may not be discussed in detail, but the techniques, methods, and devices should be considered as a part of the specification where appropriate.

Figure 1:
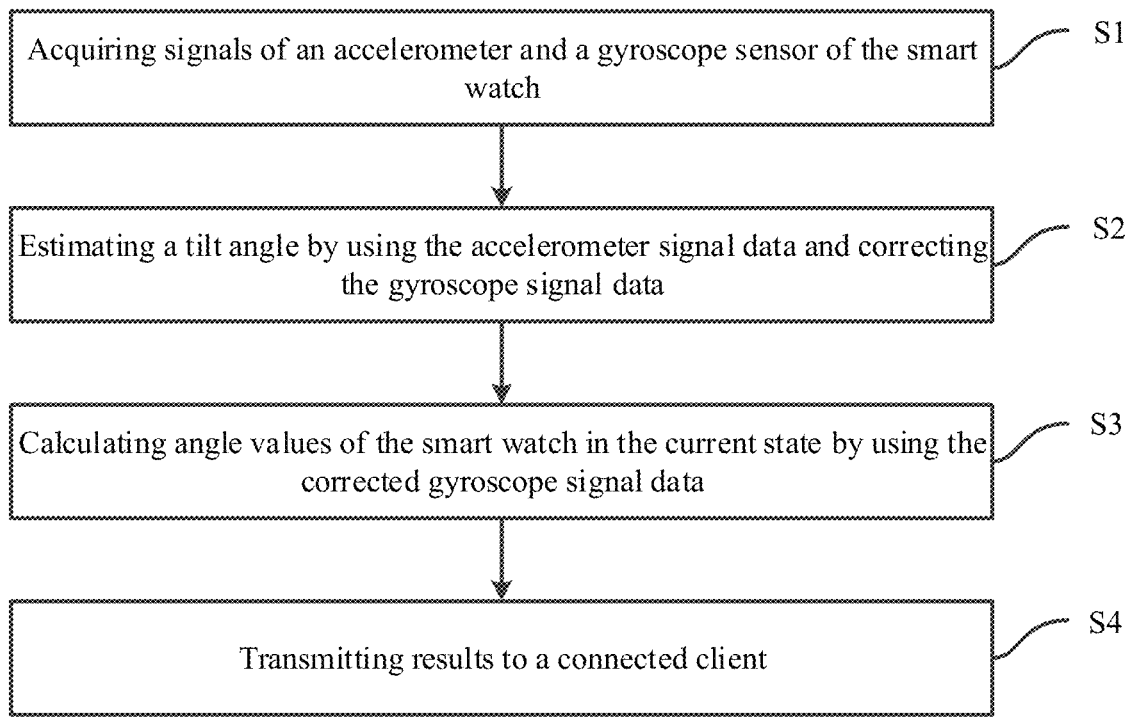
FIG. 1 is a flowchart of the method for recognizing a 2D movement track based on a smart watch according to one embodiment of the present application.

Now referring to FIG. 1, according to embodiments of the present application, a method for recognizing a 2D movement track based on a smart watch is provided, comprising the following steps.

Step S1, acquiring signals of an accelerometer and a gyroscope sensor of the smart watch.

For example, the accelerometer and the gyroscope built in the smart watch are used for signal acquisition to acquire acceleration signal data and gyroscope signal data of the smart watch. Furthermore, in order to eliminate noise or anomalous data, the acquired signals can be filtered, for example, processing the acquired data using Butterworth filtering.

The accelerometer can sense an acceleration in any direction, and characterize the magnitude and direction of an axial acceleration by measuring the force on the smart watch in a certain axial direction. The gyroscope measures an angle between a vertical axis of a gyroscope rotor and the smart watch in a three-dimensional coordinate system, calculates an angular velocity, and thereby judges the motion state of an object in the three-dimensional space through the angle and the angular velocity. Taking a three-axis accelerometer and a three-axis gyroscope as examples, the signal data of the accelerometer and the gyroscope in three axes x, y and z can be obtained, and the data can reflect the gesture movement condition of a user as the smart watch is snugly attached to the wrist of the user.

Step S2, estimating a tilt angle by using the accelerometer signal data and correcting the gyroscope signal data.

In this step, the tilt angle of the smart watch is estimated by using the accelerometer signal data, and the gyroscope signal data is corrected.

Figure 2:
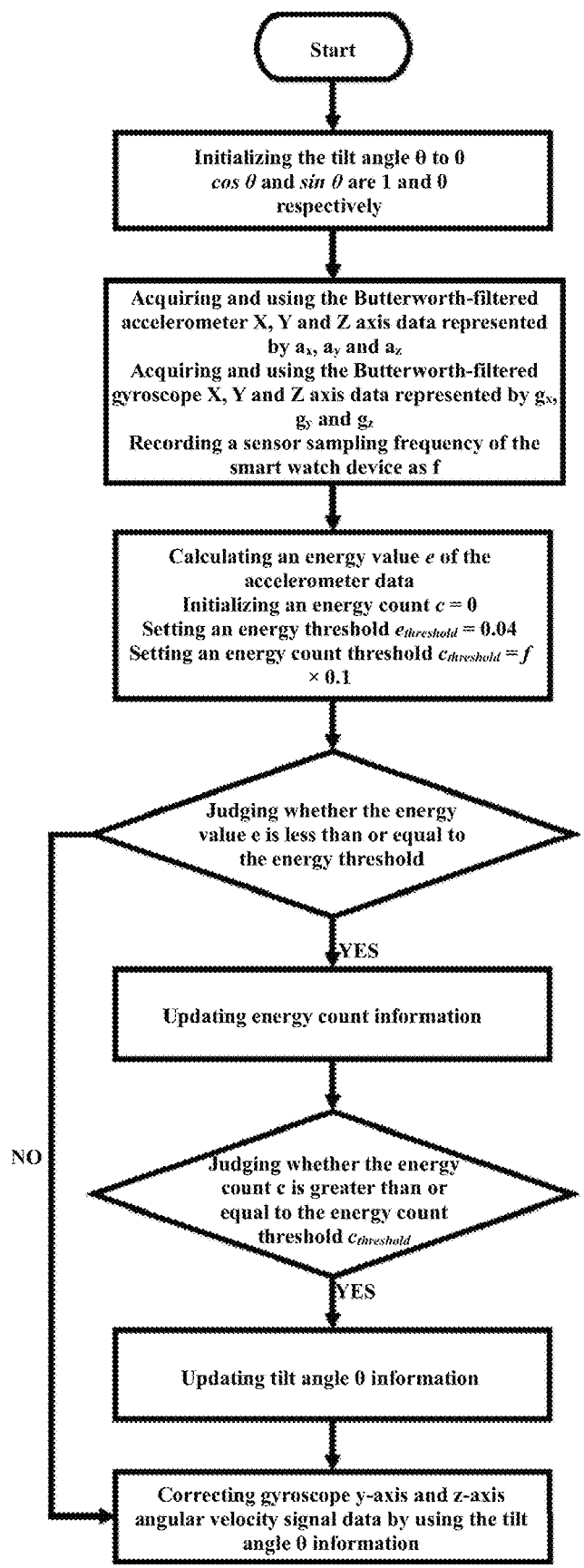
FIG. 2 is a flowchart of the gyroscope coordinate correction process according to one embodiment of the present application.

Specifically, referring to FIG. 2, the correction of the gyroscope data by using the accelerometer data comprises:

initializing the tilt angle θ to 0, and at the moment, cos θ and sin θ are 1 and 0, respectively;

acquiring and using the Butterworth-filtered accelerometer X, Y, Z axis data represented by $a_x$, $a_y$, $a_z$, acquiring and using the Butterworth-filtered gyroscope X, Y, Z axis data represented by $g_x$, $g_y$, $g_z$ and recording a sensor sampling frequency of the smart watch device as f (Hz);

calculating an energy value $e=a_x^2+a_y^2+a_z^2$ of the accelerometer data, initializing an energy count c=0, setting an energy threshold $e_{threshold}=0.04$ and an energy count threshold $c_{threshold}=f\times0.1$, and estimating the tilt angle θ by using the accelerometer signal data;

judging whether the energy value e is less than or equal to the energy threshold, and if yes, updating energy count information: c=c+1;

judging whether the energy count c is greater than or equal to the energy count threshold $c_{threshold}$, if yes, updating tilt angle θ information:

$$\sin\theta = -\frac{a_y}{\sqrt{a_y^2+a_z^2}}, \cos\theta = \frac{a_z}{\sqrt{a_y^2+a_z^2}},$$

and if no, proceeding to the next step; and correcting gyroscope y-axis and z-axis angular velocity signal data by using the tilt angle θ information, represented by $\widehat{g_y}=g_y\times\cos\theta+g_z\times\sin\theta$, $\widehat{g_z}=g_y\times(-\sin\theta)+g_z\times\cos\theta$, wherein $\widehat{g_y}$ is the corrected gyroscope y-axis data, and $\widehat{g_z}$ is the corrected gyroscope z-axis data.

It should be understood that the energy threshold and the count threshold of the embodiments of the present application may be set to appropriate values according to application scenarios and the like, and the present application is not limited thereto.

Step S3, calculating angle values of the smart watch in the current state by using the corrected gyroscope signal data.

Figure 3:
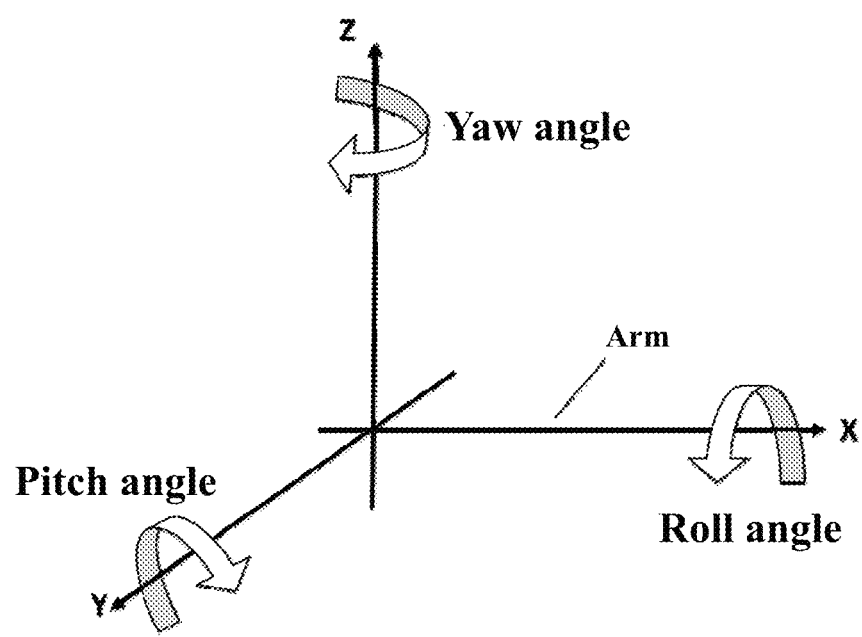
FIG. 3 is a schematic of the Euler angles according to one embodiment of the present application.

In this step, the angle value information (Euler angles) of the smart watch in the current state is calculated by using the corrected gyroscope signal data, and a current coordinate point (x, y) is further estimated, wherein the angle value information is shown in FIG. 3, including a pitch angle, a yaw angle and a roll angle.

The specific procedures comprise: setting a time interval $$dt = \frac{1}{f}$$

for two samplings of the gyroscope data; integrating the corrected gyroscope angular velocity signal data over time, represented by $\theta_x=\int g_x dt$, $\theta_y=\int \widehat{g_y} dt$, $\theta_z=\int \widehat{g_z} dt$, wherein $\theta_x$ is the roll angle, $\theta_y$ is the pitch angle, $\theta_z$ is the yaw angle; and defining basis vectors and estimating a coordinate point, for example, setting the base vectors in a two-dimensional vertical coordinate system as unit vectors $\overline{e}_x=(1,0)$, $\overline{e}_y=(0,1)$, and estimating the current coordinate point, represented by $(x, y)=\theta_z\overline{e}_x+\theta_y\overline{e}_y=(\theta_z, \theta_y)$.

Step S4, transmitting results to a connected client.

For example, the coordinate point is transmitted to the client connected to the system by using protocols such as Bluetooth, Wi-Fi and the like. The specific procedures comprise: listening to a request to connect to the system by using protocols such as Bluetooth, Wi-Fi and the like after the system is started, and maintaining a list of clients in connection; and broadcasting the coordinate point to the maintained list of clients after a gesture signal is detected by the system for recognizing the 2D movement track.

Correspondingly, the present application further provides a system for recognizing a 2D movement track based on a smart watch, for implementing one or more aspects of the method described above.

For example, the system comprises: a signal acquisition module configured for acquiring signal data of an accelerometer and a gyroscope sensor of the smart watch and processing the acquired data by using Butterworth filtering; a signal correction module configured for estimating a tilt angle of the smart watch by using the accelerometer signal data and correcting the gyroscope signal data; a calculation detection module for calculating angle values (a pitch angle, a yaw angle and a roll angle) of the smart watch in the current state by using the corrected gyroscope signal data and estimating the current coordinate point (x, y); and a data transmission module for transmitting the coordinate point to a client connected to the system by using protocols such as Bluetooth, Wi-Fi and the like.

Moreover, the signal correction module further comprises:

a data acquisition and recording unit configured for acquiring and using the Butterworth-filtered accelerometer X, Y and Z axis data represented by $a_x$, $a_y$, $a_z$ and acquiring and using the Butterworth-filtered gyroscope X, Y and Z axis data represented by $g_x$, $g_y$, $g_z$; for recording a sensor sampling frequency of the smart watch device as f; and for initializing the tilt angle θ to 0, wherein at the moment, cos θ and sin θ are 1 and 0, respectively;

a calculation setting parameter unit configured for calculating an energy value $e=a_x^2+a_y^2+a_z^2$ of the accelerometer data, initializing an energy count c=0, and setting an energy threshold $e_{threshold}=0.04$ and an energy count threshold $c_{threshold}=f\times0.1$;

a judging unit configured for judging whether the energy value e is less than or equal to the energy threshold, and if yes, updating energy count information: c=c+1; and for judging whether the energy count c is greater than or equal to the energy count threshold $c_{threshold}$, if yes, updating tilt angle θ information:

$$\sin\theta = -\frac{a_y}{\sqrt{a_y^2+a_z^2}}, \cos\theta = \frac{a_z}{\sqrt{a_y^2+a_z^2}},$$

and if no, proceeding to the correction angular velocity unit; and a correction angular velocity unit configured for correcting gyroscope y-axis and z-axis angular velocity signal data by using the tilt angle θ information: $\hat{g}_y=g_y\times\cos\theta+g_z\times\sin\theta$, $\hat{g}_z=g_y\times(-\sin\theta)+g_z\times\cos\theta$, wherein $\hat{g}_y$ is the corrected gyroscope y-axis data, and $\hat{g}_z$ is the corrected gyroscope z-axis data.

Moreover, the calculation detection module further comprises:

an angular velocity integration unit configured for setting a time interval $$dt = \frac{1}{f}$$

velocity signal data over time: $\theta_x=\int g_x dt$, $\theta_y=\int \hat{g}_y dt$, $\theta_z=\int \hat{g}_z dt$, wherein, $\theta_x$ is a roll angle, $\theta_y$ is a pitch angle, and $\theta_z$ is a yaw angle; and a coordinate point calculation unit configured for setting base vectors in a two-dimensional Cartesian coordinate system as unit vectors $\overline{e}_x=(1,0)$, $\overline{e}_y=(0,1)$, wherein a current coordinate point is $(x, y)=\theta_z\overline{e}_x+\theta_y\overline{e}_y=(\theta_z, \theta_y)$.

Moreover, the data transmission module further comprises:

a monitoring protocol unit configured for listening to a request to connect to the system by using protocols such as Bluetooth, Wi-Fi and the like after the system is started, and maintaining a list of clients in connection; and a broadcast transmission unit configured for broadcasting the coordinate point to the maintained list of clients after a gesture signal is detected by the system for recognizing the 2D movement track.

In summary, the present application can plot a displacement diagram of the movement track of the watch by combining and using the accelerometer and the gyroscope built in the smart watch, and further achieves manipulation to the target device by using gesture tracking.

It should be noted that although the procedures are described in a specific order, they are not necessarily executed in the specific order above, and in fact, some of the steps may be executed concurrently or even in a changed order as long as the required functions are achieved.

The present application may be a system, a method and/or a computer program product. The computer program product may include a computer readable storage medium having computer readable program instructions loaded thereon for causing a processor to implement various aspects of the present application.

The computer readable storage medium may be a tangible device that holds and stores the instructions for use by an instruction execution device. The computer readable storage medium may include, but is not limited to, for example, an electronic storage device, a magnetic storage device, an optical storage device, an electromagnetic storage device, a semiconductor storage device, or any suitable combination of the foregoing. More specific examples (non-exhaustive list) of the computer readable storage medium include: a portable computer disk, a hard disk drive, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device such as punch card or in-groove raised structure having instructions stored thereon, and any suitable combination of the foregoing.

While various embodiments of the present application have been described above, the descriptions are exemplary, not exhaustive, and not limited to the disclosed embodiments.

Many modifications and variations will be apparent to those of ordinary skill in the art without departing from the scope and spirit of the described embodiments. The terms used herein are chosen in order to best explain the principles of the embodiments, the practical application or technical improvements in the market, or to enable others of ordinary skill in the art to understand the embodiments disclosed herein.

What is claimed is:

1. A method for recognizing a two-dimensional (2D) movement track based on a smart watch, comprising:
   acquiring accelerometer signal data and gyroscope signal data of the smart watch;
   estimating a tilt angle of the smart watch by using the accelerometer signal data and correcting the gyroscope signal data by using the tilt angle; and
   calculating angle value information of the smart watch by using the corrected gyroscope signal data and estimating a coordinate point;
   wherein estimating the tilt angle of the smart watch by using the accelerometer signal data and correcting the gyroscope signal data by using the tilt angle comprises following sub-steps:
   recording X, Y, and Z axis data of the accelerometer signal data as $a_x$, $a_y$, $a_z$, respectively, and recording X, Y, and Z axis data of the gyroscope signal data as $g_x$, $g_y$, $g_z$, respectively;
   calculating an energy value $e=a_x^2+a_y^2+a_z^2$ of the accelerometer signal data, initializing an energy count $c=0$, and setting an energy threshold $e_{threshold}$ and an energy count threshold $c_{threshold}$;
   judging whether the energy value e of the accelerometer signal data is less than or equal to the energy threshold, and if the energy value e of the accelerometer signal data is less than or equal to the energy threshold, updating energy count information $c=c+1$: judging whether the energy count c is greater than or equal to the energy count threshold $c_{threshold}$, and if the energy count c is greater than or equal to the energy count threshold $c_{threshold}$, updating tilt angle information represented by $$\sin\theta = -\frac{a_y}{\sqrt{a_y^2+a_z^2}}, \cos\theta = \frac{a_z}{\sqrt{a_y^2+a_z^2}};$$

correcting gyroscope V-axis and z-axis angular velocity signal data by using the updated tilt angle information, represented by $\widehat{g_y}=g_y\times\cos\theta+g_z\times\sin\theta$, $\widehat{g_z}=g_y\times(-\sin\theta)+g_z\times\cos\theta$, wherein $\widehat{g_y}$ is the corrected gyroscope y-axis angular velocity signal data, and $\widehat{g_z}$ is the corrected gyroscope z-axis angular velocity signal data.

2. The method for recognizing the 2D movement track based on the smart watch according to claim 1, wherein the energy count threshold is set to $c_{threshold}=f\times0.1$, and the energy threshold is set to $e_{threshold}=0.04$, wherein f is a data sampling frequency.

3. The method for recognizing the 2D movement track based on the smart watch according to claim 1, wherein the calculating of the angle value information of the smart watch by using the corrected gyroscope signal data and estimating the coordinate point comprises:
   setting a time interval $$dt = \frac{1}{f}$$

for two samplings of the corrected gyroscope signal data;
   integrating the corrected gyroscopey-axis and z-axis angular velocity signal data over time, represented by $\theta_x=\int g_x dt$, $\theta_y=\int \widehat{g_y} dt$, $\theta_z=\int \widehat{g_z} dt$, wherein $\theta_x$ is a roll angle, $\theta_y$ is a pitch angle, and $\theta_z$ is a yaw angle; and
   setting base vectors in a two-dimensional Cartesian coordinate system as unit vectors $\overline{e_x}=(1,0)$, $\overline{e_y}=(0,1)$, wherein a current coordinate point is (x, y)=$\theta_z\overline{e_x}+\theta_y\overline{e_y}=(\theta_z, \theta_y)$.

4. The method for recognizing the 2D movement track based on the smart watch according to claim 1, further comprising: broadcasting the coordinate point to a maintained list of clients after the estimated coordinate point is obtained.

5. The method for recognizing the 2D movement track based on the smart watch according to claim 1, wherein the acquired accelerometer signal data and gyroscope signal data of the smart watch are processed using Butterworth filtering.

6. A non-transitory computer-readable storage medium having a computer program stored thereon, wherein the computer program implements the method according to claim 1 when executed by a processor.

7. A computer device, comprising a non-transitory memory and a processor, wherein a computer program capable of being executed by the processor is stored in the non-transitory memory, and the computer program implements the method according to claim 1 when executed by the processor.

8. The non-transitory computer-readable storage medium according to claim 6, wherein the energy count threshold is set to $c_{threshold}=f\times0.1$, and the energy threshold is set to $e_{threshold}=0.04$, wherein f is a data sampling frequency.

9. The non-transitory computer-readable storage medium according to claim 6, wherein the calculating of the angle value information of the smart watch by using the corrected gyroscope signal data and estimating the coordinate point comprises:
   setting a time interval $$dt = \frac{1}{f}$$

for two samplings of the corrected gyroscope signal data;
   integrating the corrected gyroscope y-axis and z-axis angular velocity signal data over time, represented by $\theta_x=\int g_x dt$, $\theta_y=\int \widehat{g_y} dt$, $\theta_z=\int \widehat{g_z} dt$, wherein $\theta_x$ is a roll angle, $\theta_y$ is a pitch angle, and $\theta_z$ is a yaw angle; and
   setting base vectors in a two-dimensional Cartesian coordinate system as unit vectors $\overline{e_x}=(1,0)$, $\overline{e_y}=(0,1)$, wherein a current coordinate point is (x, y)=$\theta_z\overline{e_x}+\theta_y\overline{e_y}=(\theta_z, \theta_y)$.

10. The non-transitory computer-readable storage medium according to claim 6, further comprising: broadcasting the coordinate point to a maintained list of clients after the estimated coordinate point is obtained.

11. The non-transitory computer-readable storage medium according to claim 6, wherein the acquired accelerometer signal data and gyroscope signal data of the smart watch are processed using Butterworth filtering.

12. A system for recognizing a 2D movement track based on a smart watch, comprising:
- an acquisition module configured for acquiring accelerometer signal data and gyroscope signal data of the smart watch;
- an estimation module configured for estimating a tilt angle of the smart watch by using the accelerometer signal data and correcting the gyroscope signal data by using the tilt angle; and
- a calculation module configured for calculating angle value information of the smart watch by using the corrected gyroscope signal data and estimating a coordinate point;
- wherein estimating the tilt angle of the smart watch by using the accelerometer signal data and correcting the gyroscope signal data by using the tilt angle comprises:
- recording X, Y, and Z axis data of the accelerometer signal data as $a_x$, $a_y$, $a_z$, respectively, and recording X, Y, and Z axis data of the gyroscope signal data as $g_x$, $g_y$, $g_z$, respectively;
- calculating an energy value $e=a_x^2+a_y^2+a_z^2$ of the accelerometer signal data, initializing an energy count c=0, and setting an energy threshold $e_{threshold}$ and an energy count threshold $c_{threshold}$;
- judging whether the energy value e of the accelerometer signal data is less than or equal to the energy threshold, and if the energy value e of the accelerometer signal data is less than or equal to the energy threshold, updating energy count information c=c+1; judging whether the energy count c is greater than or equal to the energy count threshold $c_{threshold}$, and if the energy count c is greater than or equal to the energy count threshold $c_{threshold}$, updating tilt angle information represented by $$\sin\theta = -\frac{a_y}{\sqrt{a_y^2+a_z^2}}, \cos\theta = \frac{a_z}{\sqrt{a_y^2+a_z^2}};$$

and
- correcting gyroscope y-axis and z-axis angular velocity signal data by using the updated tilt angle information, represented by $\widehat{g_y} = g_y \times \cos\theta + g_z \times \sin\theta$, $\widehat{g_z} = g_y \times (-\sin\theta) + g_z \times \cos\theta$, wherein $\widehat{g_y}$ is the corrected gyroscope y-axis angular velocity signal data, and $\widehat{g_z}$ is the corrected gyroscope z-axis angular velocity signal data.

13. The system for recognizing the 2D movement track based on the smart watch according to claim 12, further comprising:
- a monitoring protocol unit configured for listening to a request to connect to the system and maintaining a list of connected clients; and
- a broadcast transmission unit configured for broadcasting the coordinate point to the maintained list of connected clients.

14. The computer device according to claim 7, wherein the energy count threshold is set to $c_{threshold}=f\times0.1$, and the energy threshold is set to $e_{threshold}=0.04$, wherein f is a data sampling frequency.

15. The computer device according to claim 7, wherein the calculating of the angle value information of the smart watch by using the corrected gyroscope signal data and estimating the coordinate point comprises:
- setting a time interval $$dt = \frac{1}{f}$$

for two samplings of the corrected gyroscope signal data;
- integrating the corrected gyroscope y-axis and z-axis angular velocity signal data over time, represented by $\theta_x=\int g_x dt$, $\theta_y=\int \widehat{g_y} dt$, $\theta_z=\int \widehat{g_z} dt$, wherein $\theta_x$ is a roll angle, $\theta_y$ is a pitch angle, and $\theta_z$ is a yaw angle; and
- setting base vectors in a two-dimensional Cartesian coordinate system as unit vectors $\overline{e_x}=(1,0)$, $\overline{e_y}=(0,1)$, wherein a current coordinate point is $(x, y)=\theta_z\overline{e_x}+\theta_y\overline{e_y}=(\theta_z, \theta_y)$.

16. The computer device according to claim 7, further comprising: broadcasting the coordinate point to a maintained list of clients after the estimated coordinate point is obtained.

17. The computer device according to claim 7, wherein the acquired accelerometer signal data and gyroscope signal data of the smart watch are processed using Butterworth filtering.

* * * * *